United States Patent Office 3,296,253
Patented Jan. 3, 1967

3,296,253
PYRAZOLES OF 21-ALKYL STEROIDS OF THE PREGNANE SERIES
Ralph F. Hirschmann, Scotch Plains, N.J., assignor to Merck & Co., Inc., Rahway, N.J., a corporation of New Jersey
No Drawing. Filed Mar. 19, 1964, Ser. No. 353,289
5 Claims. (Cl. 260—239.5)

This invention is concerned generally with novel [3,2-c] pyrazole compounds of the pregnane series, and with processes of preparing the same. More particularly, it relates to 21-alkyl-17α,21-dihydroxy-4-pregneno-[3,2-c] pyrazoles and the 4,6-pregnadieno and 5α-pregnano analogues thereof; and to processes of making these compounds.

These novel steroids may be represented by the following structural formulas:

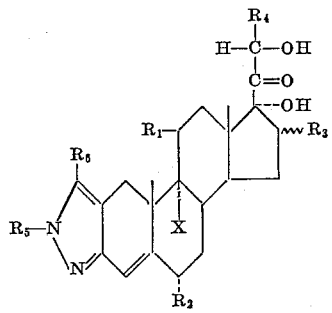

and

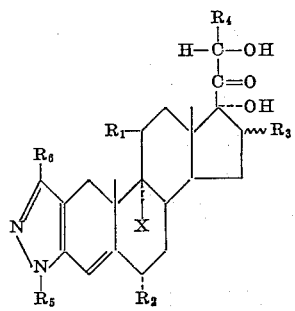

and the 17α,21-acetals, ketals and cyclic ortho esters thereof, wherein $R_1$ is selected from the group consisting of hydrogen, β-hydroxy, β-chloro and keto, but halogen is present at $R_1$ only when X is halogen, and hydrogen is present at $R_1$ only when X is hydrogen; $R_2$ is selected from the group consisting of hydrogen, α-methyl and α-fluoro; $R_3$ is selected from the group consisting of hydrogen, α-methyl, β-methyl, α-fluoro and methylene; $R_4$ is alkyl, $R_5$ is a member of the group consisting of alkyl, aralkyl, cycloalkyl, aryl, a heterocyclic nucleus, and substituted derivatives thereof, $R_6$ is a member of the group consisting of alkoxycarbonyl, carboxyl, hydroxymethyl and methyl, and X is selected from the group consisting of hydrogen and halogen.

This invention also includes the 4,6-pregnadieno- and the 5α-pregnano-analogues of all of the above compounds. Compounds in which $R_5$ is hydrogen or acyl are prepared by another process and claimed in copending application Serial Number 353,225, filed March 19, 1964, now abandoned.

The 4-pregneno- and 4,6-pregnadieno-[3,2-c]pyrazole starting materials (Compound I in the Flow Sheet) can be prepared according to methods described in U.S.P. 3,067,193 and U.S.P. 3,067,194. The 5α-pregnano-[3,2-c]pyrazole starting materials are prepared, following the procedures of Example 8. Starting materials having a 16α-fluoro group can be prepared following the procedures outlined in Example 9. The 5'-substituted-[3,2-c]pyrazoles can be prepared, for example, by methods described in Example 10.

The 17α,21-cyclic acetals and ketals are prepared by an acid catalyzed interchange reaction between steroids having the dihydroxy-acetone side chain and lower alkyl acetals of aliphatic, cycloaliphatic, or arylaliphatic aldehydes or ketones. In a preferred embodiment of my invention, the steroid is heated with an acetone dialkyl ketal, for example, 2,2-dimethoxypropane, in the presence of an acidic reagent such as p-toluenesulfonic acid to give the corresponding 17α,21-isopropylidenedioxy-derivative.

Other aldehydes and ketones which may be used to prepare acetals and ketals for this reaction include acetaldehyde, butyraldehyde, (2-mehtyl)butyraldehyde, caproaldehyde, benzaldehyde, cyclopentanone and cyclohexanone. When reacting with a steriod having an 11β-hydroxy-group the product may be a mixture of the corresponding 17α,21-acetal or ketal with a derivative having the acetal or ketal group also at the 11β-hydroxy position. The products may be separated by chromatography.

The 17α,21-cyclic ortho esters defined by compound 2, wherein an alkoxy group is present at A and an alkyl group at B, are prepared by the reaction of the corresponding 17α,21-dihydroxy compound with a lower alkyl ortho ester, for example, by brief distillation in benzene in the presence of a small amount of an acid catalyst. Two isomers are possible due to a new asymmetric carbon atom. At least in the case of orthoformates, the two epimers may be isolated, or may be obtained by stereospecific synthesis by a proper choice of the acid catalyst. Thus, the use of pyridine hydrochloride leads to the formation with the more dextrorotatory epimer, whereas a reaction catalyzed by p-toluenesulfonic acid furnishes the epimer with negative $M_D$ contribution. With compounds carrying an 11β-hydroxy group, the procedure may lead also to the formation of a bis-orthoester; using ethyl orthoformate, for example, the 11-diethoxymethyl ether of 17α,21-ethylorthoformate may be formed.

Compounds in which the 17α,21-positions are protected by a cyclic group (Compound II of the Flow Sheet) are then alkylated at the 21-position to afford the 21-alkyl derivatives. In a preferred embodiment of this invention, alklation is brought about by treating the steroid first with potassium t-butoxide in t-butanol and then with an alkyl iodide. Any hydrogen present at a pyrazole nitrogen will likewise be alkylated by this procedure.

The protecting cyclic group at the 17α,21-position is then removed by treatment with an acidic reagent to afford the corresponding 17α,21 - dihydroxy - compound (Compound IV). For example, the 17α,21-acetal or ketal group is removed by treatment with a dilute organic acid, such as acetic or formic acid; any acetal or ketal group present at the 11β-hydroxy position will also be removed by this treatment.

The 17α,21-orthoesters are also hydrolyzed by acids. For example, the cyclic orthoformates regenerate the starting free alcohols in high yield on heating for ten minutes in methanol with a few drops of N HCl. However, carrying out the hydrolysis with HCl at room temperature, or by carrying out the hydrolysis with oxalic acid by heating, a mixture of 17α-monoformate and 21-monoformate is obtained, which mixture can be separated by fractional crystallization or by chromatography. The 21-monoesters may also be formed by refluxing the 17α-monoester in benzene in the presence of p-toluenesulfonic acid. This rearrangement occurs readily, oftentimes in quantitative yield. The 17α-monoformate or 21-monoformate can be hydrolyzed to the 17α-hydroxy or 21-hydroxy compound by heating with N HCl.

Among the compounds of my invention are included the 1' and 2'-alkyl, 1' and 2'-aryl and 1' and 2'-derivatives containing a heterocyclic nucleus, of 17α,21-dihydroxy-21-methyl-20-oxo-4-pregneno-[3,2-c]pyrazole,
6α-fluoro-17α,21-dihydroxy-21-methyl-20-oxo-4-pregneno-[3,2-c]pyrazole,
17α,21-dihydroxy-6α,21-dimethyl-20-oxo-4-pregneno-[3,2-c]pyrazole,
17α,21-dihydroxy-16α,21-dimethyl-20-oxo-4-pregneno-[3,2-c]pyrazole,
17α,21-dihydroxy-16β,21-dimethyl-20-oxo-4-pregneno-[3,2-c]pyrazole,
17α,21-dihydroxy-21-methyl-16-methylene-20-oxo-4-pregneno-[3,2-c]pyrazole,
16α-fluoro-17α,21-dihydroxy-21-methyl-20-oxo-4-pregneno-[3,2-c]pyrazole;
17α,21-dihydroxy-21-methyl-20-oxo-4,6-pregnadieno-[3,2-c]pyrazole,
6-fluoro-17α,21-dihydroxy-21-methyl-20-oxo-4,6-pregnadieno-[3,2-c]pyrazole,
17α,21-dihydroxy-6,21-dimethyl-20-oxo-4,6-pregnadieno-[3,2-c]pyrazole,
17α,21-dihydroxy-16α,21-dimethyl-20-oxo-4,6-pregnadieno-[3,2-c]pyrazole,
17α,21-dihydroxy-16β,21-dimethyl-20-oxo-4,6-pregnadieno-[3,2-c]pyrazole;
17α,21-dihydroxy-21-methyl-16-methylene-20-oxo-4,6-pregnadieno-[3,2-c]pyrazole,
16α-fluoro-17α,21-dihydroxy-21-methyl-20-oxo-4,6-pregnadieno-[3,2-c]pyrazole;
17α,21-dihydroxy-21-methyl-20-oxo-5α-pregnano-[3,2-c]pyrazole,
6α-fluoro-17α,21-dihydroxy-21-methyl-20-oxo-5α-pregnano-[3,2-c]pyrazole,
17α,21-dihydroxy-6α,21-dimethyl-20-oxo-5α-pregnano-[3,2-c]pyrazole,
17α,21-dihydroxy-16α,21-dimethyl-20-oxo-5α-pregnano-[3,2-c]pyrazole,
17α,21-dihydroxy-16β,21-dimethyl-20-oxo-5α-pregnano-[3,2-c]pyrazole,
17α,21-dihydroxy-21-methyl-16-methylene-20-oxo-5α-pregnano-[3,2-c]pyrazole, as well as the 11β-hydroxy, 11-oxo, 11β-hydroxy-9α,fluoro, and the 9α,11β-dichloro derivative thereof; there are likewise included 21-alkyl homologues, and the 5'-alkoxycarbonyl, 5'-carboxyl, 5'-hydroxymethyl and 5'-methyl dreivatives of all of the foregoing compounds.

The [3,2-c]pyrazolo-compounds described in the foregoing description form salts such as the hydrochloride, sulfate, chlorate, perchlorate, picrate and trichloroacetate, on treatment with the corresponding acid.

The 21-alkyl-17α,21-dihydroxy-20-oxo-[3,2-c]pyrazole compounds of the pregnane series produced in accordance with the present invention possess high anti-inflammatory activity, and are especially effective for the treatment of arthritis and related diseases since they can be administered for its cortisone-like action in low dosage thereby minimizing undesirable side effects. The 17α,21-cyclic intermediate compounds defined by Compounds II and III in the Flow Sheet likewise have anti-inflammatory activity.

The following procedures are particularly described starting with the 11β,17α,21-trihydroxy-20-oxo-2'-phenyl-4-pregneno-[3,2-c]pyrazole, but are generally applicable to all of the starting materials defined by Compound IA and IB of the Flow Sheet.

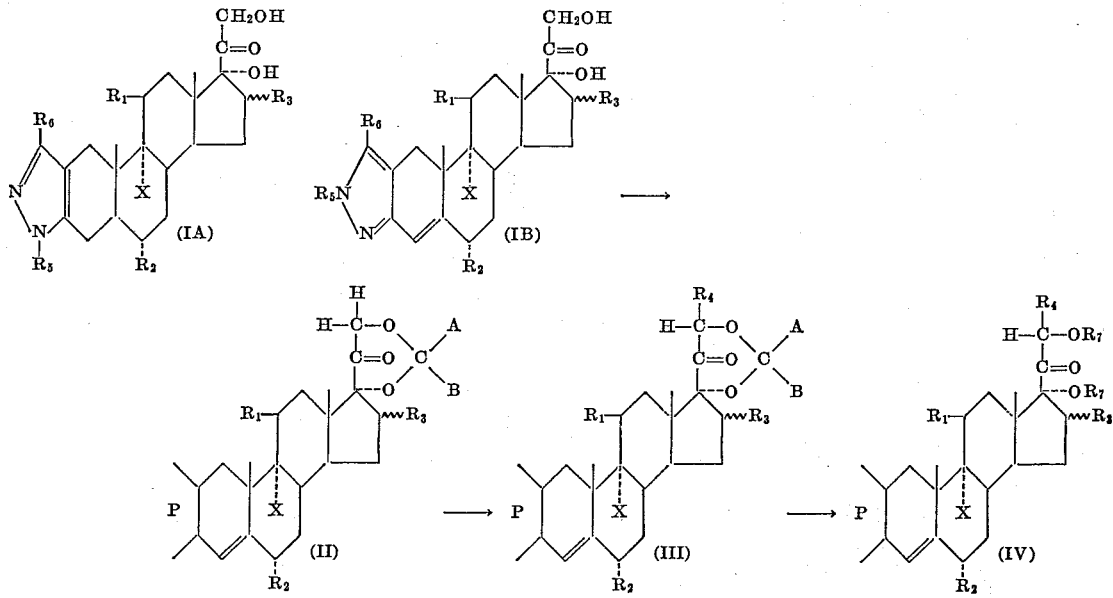

wherein $R_1$ is a member of the group consisting of hydrogen, 11β-hydroxy, 11β-chloro, and keto, but halogen is present at $R_1$ only when X is halogen, and hydrogen is present at $R_1$ only when X is hydrogen; $R_2$ is a member of the group consisting of hydrogen, α-fluoro and α-methyl; $R_3$ is a member of the group consisting of hydrogen, α-fluoro, α-methyl, β-methyl and methylene; $R_4$ is alkyl, $R_5$ is a member of the group consisting of hydrogen, alkyl, aralkyl, cycloalkyl, aryl, a heterocyclic nucleus and substituted derivatives, $R_6$ is a member of the group consisting of methyl, hydroxymethyl, carboxy and alkoxycarbonyl, $R_7$ is a member of the group consisting of hydrogen and alkanoyl, X is a member of the group consisting of hydrogen and halogen. A and B are each selected from the group consisting of hydrogen, alkyl and aryl and together with the carbon to which they are joined, A and B may be cycloalkyl; A may also be alkoxy when B is alkyl.

The broken ring designated as "P" represents a pyrazole ring which is substituted at the $R_5$ position and can be substituted at the $R_6$ position.

This Flow Sheet also includes the 5α-pregnano- and the 4,6-pregnadieno analogues of all of the compounds shown.

Example 1

A solution of 2 grams of 11β,17α,21-trihydroxy-20-oxo-2'-phenyl-4-pregneno-[3,2-c]pyrazole in 4 ml. of dimethylformamide and 15 ml. of 2,2-dimethoxypropane with 10 mg. of p-toluenesulfonic acid is heated to reflux for six to ten hours to give 11β-hydroxy-17α,21-isopropylidenedioxy-20-oxo-2'-phenyl-4-pregneno-[3,2-c]pyrazole. The product is isolated by removal of the solvents under reduced pressure; the purified product gives a negative tetrazolium test using the triphenyltetrazolium chloride reagent and has the same ultraviolet spectrum as the starting material.

Example 2

A suspension of 1.5 g. of the above product in 30 ml. of t-butyl alcohol is added to a solution of potassium in about 20 ml. of t-butyl alcohol, using an inert atmosphere. A solution of about 0.3 ml. of methyl iodide in 2.5 ml. of t-butyl alcohol is added dropwise with stirring and the reaction mixture is allowed to stand at room temperature for several hours. If necessary, the mixture is refluxed until substantially no starting material is left. The excess base is neutralized with acetic acid and the solvents are removed under vacuum. The residue is taken up in chloroform and washed with water until free of inorganic salts. The chloroform solution is dried and the chloroform then evaporated to afford 11β-hydroxy-17α,21-isopropylidenedioxy-21-methyl-20-oxo-2'-phenyl - 4 - pregneno-[3,2-c-]pyrazole.

In accordance with the above procedure, but using another alkylating agent in place of methyl iodide, there is obtained the corresponding 21-alkyl-11β-hydroxy-17α,21-isopropylidenedioxy - 20 - oxo - 2' - phenyl-4-pregneno-[3,2-c]pyrazole. Any hydrogen present at a pyrazole nitrogen will likewise be alkylated in this process.

Example 3

A solution of 100 milligrams of the 11β-hydroxy-17α,21 - isopropylidenedioxy - 21-methyl-20-oxo-2'-phenyl-4-pregneno-[3,2-c]pyrazole in 10 cc. of 50% aqueous acetic acid is heated on a steam bath under nitrogen for about 45 minutes. The solvents are removed to obtain 11β,17α,21 - trihydroxy - 21-methyl-20-oxo-2'-phenyl-4-pregneno-[3,2-c]pyrazole.

Example 4

A suspension of 2 grams of 11β,17α,21-trihydroxy-20-oxo-2'-phenyl-4-pregneno-[3,2-c]pyrazole in 800 ml. of benzene containing 5 mg. p-toluenesulfonic acid is rendered anhydrous, by brief distillation, at which point 5 ml. of cyclopentanone diethyl acetal is added, the distillation being vigorously continued for 20 minutes. Neutralization with pyridine, solvent evaporation, and addition of methanol affords the 11β-hydroxy-17α,21-cyclopentanonide-20-oxo-2'-phenyl-4-pregneno-[3,2-c]pyrazole which has the following structure.

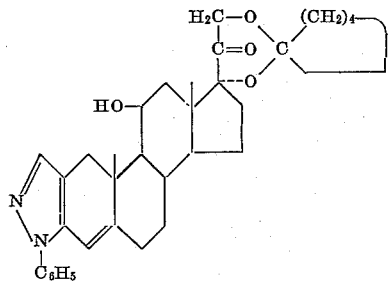

Methylation of the above product, following the procedure of Example 2, gives the 21-methyl-11β-hydroxy-17α,21 - cyclopentanonide - 20-oxo-2'-phenyl-4-pregneno-[3,2-c]pyrazole.

Hydrolysis of the 17α,21-cyclopentanonide, following the procedure of Example 3, gives the 2-methyl-11β,17α,21 - trihydroxy - 20 - oxo-2'-phenyl-4-pregneno-[3,2-c] pyrazole.

Example 5

A mixture of 2 g. of 11β,17α,21-trihydoxy-20-oxo-2'-phenyl-4-pregneno-[3,2-c]pyrazole, 5 ml. of benzene and 15 ml. of methyl orthoformate is distilled in the presence of 10 mg. of p-toluenesulfonic acid to form the 11β-hydroxy-17α,21-methyl ortho formate-20-oxo-2'-phenyl-4-pregneno-[3,2-c]pyrazole, which has the following structure:

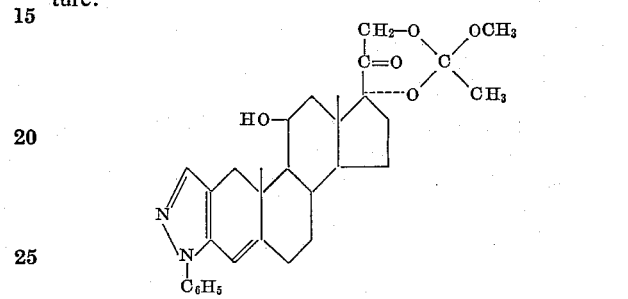

In accordance with the above procedure, but using methyl orthoacetate in place of the methyl orthoformate, the corresponding 17α,21-methyl orthoacetate is obtained.

In accordance with the above procedures, but using methyl orthovalerate in place of methyl orthoformate, the corresponding 17α,21-methyl orthovalerate is obtained.

Example 6

A suspension of 1.5 g. of the 11β-hydroxy-17α,21-methyl orthoformate-20-oxo-2'-phenyl-4-pregneno-[3,2-c]pyrazole in 30 ml. of t-butyl alcohol is added to a solution of potassium in about 20 ml. of t-butyl alcohol using an inert atmosphere. A solution of about 0.3 ml. of methyl iodide in 2.5 ml. of t-butyl alcohol is added dropwise with stirring and the reaction mixture is allowed to stand at room temperature for several hours. If necessary, the mixture is refluxed until substantially no starting material is left. The excess base is neutralized with acetic acid and the solvents are removed under vacuum. The residue is taken up in chloroform and washed with water until free of inorganic salts. The chloroform solution is dried and the chloroform then evaporated to afford the 21-methyl-derivative which has the following structure:

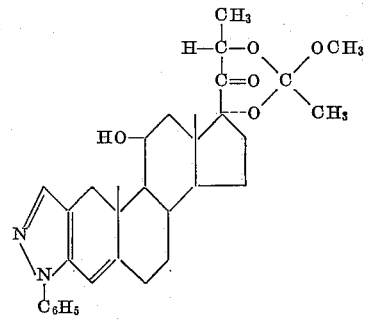

In accordance with the above procedure, but using another alkylating agent in place of methyl iodide, there is obtained the corresponding 21-alkyl-17α,21-methyl orthoformate - 20 - oxo-2'-phenyl-4-pregneno-[3,2-c]pyrazole. Any hydrogen present at a pyrazole nitrogen will likewise be alkylated in this process.

Example 7

A solution of 1 gram of 11β-hydroxy-21-methyl-17α, 21-methylorthoformate-20-oxo-2'-phenyl - 4 - pregneno-[3,2-c]pyrazole in 40 cc. of methanol, to which a few drops of N HCl has been added, is heated on a steam bath under nitrogen for about 10 minutes. The solvents are removed to obtain the 11β,17α,21-trihydroxy-21-methyl-20-oxo-2'-phenyl-4-pregneno-[3,2-c]pyrazole.

In the above procedure, if the mixture is allowed to stand at room temperature for ½ hour, a mixture of the 17α-monoformate and the 21-monoformate is obtained. The mixture can be separated by chromatography.

*Example 8*

The 5α-pregnano-[3,2-c] starting materials can be prepared by the following procedures which are particularly described for the preparation of 11β,17α,21-trihydroxy-20-oxo-5α-pregnano-[3,2-c]pyrazole:

To a suspension of 25.0 g. of 11β,17α,21-trihydroxy-4-pregnene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paperstrip chromatography. A 2.425 g. aliquot is recrystallized three times from a mixture of benzene and n-hexane to give 17α,20,20,21-bis(methylenedioxy)-11β-hydroxy-4-pregnene-3-one.

Lithium wire (0.9 g.) is dissolved in approximately 100 ml. of ammonia. A slurry of 19.8 grams of 17α,20,20,21-bis(methylenedioxy)-11β-hydroxy-4-pregnene-3-one in tetrahydrofuran is added. The mixture is allowed to stir under a dried ice condenser for 2½ hours, after which the methanol is added and the ammonia is allowed to evaporate. The product is distributed between chloroform and water and the chloroform extracts are washed with water, dried over anhydrous magnesium sulfate and concentrated under vacuum to a crystalline residue (20.4 grams), chromatographed over alkaline alumina and elution with a mixture of 30% chloroform in ether affords 9.7 g. of 17α,20,20,21-bis(methylenedioxy)-11β-hydroxy-5α-pregnane-3-one, M.P. 215–219° C.

The above 17α,20,20,21-bis(methylenedioxy)-11β-hydroxy-5α-pregnane-3-one can also be prepared by the following route: 11β,17α,21-trihydroxy - 4 - pregnene-3,20-dione (50 g.), M.P. 214–217° C. is dissolved in 350 ml. of methanol and 2–5 liters of benzene on a steam bath. The steroid is reduced with 45.0 g. of 5% Pd/BaSO₄ at room temperature and 30 pounds pressure for about 21 hours. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. It is then allowed to stand over night at 5° C. There is obtained about 12.6 grams of 11β,17α,21-trihydroxy-5α-pregnane-3,20-dione crystals, M.P. 235–237° C. The 11β,17α,21-trihydroxy-5α-pregnane-3-one (12.0 g.) is suspended in 735 ml. of methylene chloride, and then poured into a cold mixture of 240 ml. of concentrated HCl and 240 ml. of formaldehyde (low in methanol) while maintaining the temperature at 5° C. After standing over night the layers are separated and the aqueous layer is extracted with 40 ml. of methylene chloride. The organic layer is washed with water and then 3 times with 50 ml. of sodium bicarbonate solution. The organic layer is then dried over magnesium sulfate, filtered and concentrated under vacuum to dryness. The residue is dissolved in 5:3 ether mixture of ether and chloroform and chromatographed on 246 g. of acid washed alumina. An additional quantity of product is collected from the eluant giving a total yield of 17α,20,20,21-bis(methylenedioxy)-11β-hydroxy-5α-pregnane-3-one, M.P. 180–198° C. The product is crystallized from ethyl acetate.

A mixture of 1.2 g. of sodium hydride as a 53% dispersion in mineral oil, 40 ml. of absolute benzene, and 1.2 ml. of absolute t-butanol are stirred together under nitrogen at room temperature for 20 minutes. This mixture is then added to a solution of 3.800 g. of 17α,20,20,21-bis(methylenedioxy)-11β-hydroxy - 5α-pregnane-3-one in a mixture of 150 ml. of absolute benzene and 7 ml. of freshly distilled ethyl formate. Reaction mixture is stirred under nitrogen at room temperature over night and then poured into water.

The basic aqueous solution is extracted once with a mixture of benzene and ether (1:1), and once with ether. The organic layers are washed once with 2 N-potassium hydroxide solution. The combined base extracts are ice cooled and acidified with 18% hydrochloric acid. The product is back extracted with ethyl acetate to give 3.75 g. of semi-crystalline material. One crystallization from ether yields 3.04 g. of crystalline 17α,20,20,21-bis(methylenedioxy) - 11β - hydroxy - 2 - hydroxymethylene - 5α-pregnane-3-one, M.P. 251–253° C.

The 17α,20,20,21-bis(methylenedioxy)-11β-hydroxy-2-hydroxymethylene-5α-pregnane-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21-bis(methylenedioxy)-11β-hydroxy-5α-pregnano-[3,2-c]pyrazole.

The 17α,20,20,21-bis(methylenedioxy)-11β-hydroxy-5α-pregnano-[3,2-c]pyrazole (720 mg.) is heated in a steam bath with 24 ml. of a 60% aqueous solution of formic acid for about 30 minutes. The excess reagent is removed under vacuum using a water bath at about 50° C. as the source of heat. The residue is flushed four times with n-hexane and then dried at 60° C. in high vacuum to give an amorphous solid which is a mixture of 11β,17α,21-trihydroxy-20-oxo-5α-pregnano-[3,2-c]pyrazole and 21-formyloxy - 11β,17α - dihydroxy - 20 - oxo-5α-pregnano-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 11β,17α,21-trihydroxy-20-oxo-5α-pregnano-[3,2-c]pyrazole.

*Example 9*

The starting materials having a 16α-fluoro group can be prepared by the following procedures:

Two hundred and fifty milligrams of the 3-enol ethyl ether of methyl 3,11-diketo-4,17(20)-pregnadiene-21-oate is dissolved in 5 ml. of dry pyridine. This mixture is cooled to —20° C. and perchloryl fluoride is bubbled through slowly for three minutes. It is then poured into ice and water and extracted several times with ethyl acetate. The organic layer is washed first with dilute hydrochloric acid and then with 5% sodium bicarbonate, and then dried. The residue, after removal of solvent, is a mixture of the 6α and 6β-fluoro-isomers and is used in the next step without purification.

Three hundred and eighty-five milligrams of the crude 3-enol ethyl ether of methyl 3,11-diketo-4,17(20)-pregnadiene-21-oate is dissolved in 10 ml. of acetone containing 0.17 g. of sodium acetate dissolved in 1.7 ml. of water and the mixture is cooled to 0° C. N-chlorosuccinimide (170 mg.) is added, immediately followed by 0.17 ml. of glacial acetic acid. The reaction mixture is stirred in the ice bath for one and one-half hours and is then poured into ice water and extracted into ethyl acetate. Removal of the dried solvent leaves a residue containing methyl-6α - chloro - 3,11 - diketo - 4,17(20)-pregnadiene-21-oate which is used directly in the next step.

Two hundred milligrams of the crude methyl-6ξ-fluoro-3,11-diketo-4,17(20)pregnadiene-21-oate are refluxed in a Dean-Stark water separator in 10 ml. of benzene with 0.5 ml. of pyrrolidine and 50 mg. of p-toluenesulfonic acid. After twenty-four hours, the cooled reaction mixture is extracted rapidly once with water, dried and taken to dryness. The residue is redissolved in 10 ml. of tetrahydrofuran, 200 mg. of lithium aluminum hydride are added and the mixture is refluxed for two hours. Water is cautiously added to the cooled reaction mixture, followed by ethyl acetate. The organic layer is separated and taken to dryness. The residue is refluxed for four hours with 0.75 g. of sodium acetate, 1 ml. of water, 0.4 ml. of glacial acetic acid and 10 ml. of methanol. Ethyl acetate and water are added and the separated and dried organic layer is taken to dryness. The residue is then treated with 1 ml. of acetic anhydride and 1 ml. of pyridine for eighteen hours at room temperature. Removal of these reagents under vacuum and chromatography on neutral alumina affords 6α - fluoro - 11β,21 - dihydroxy-4,17(20)-pregnadiene-3-one 21-acetate.

In accordance with the above procedure, but starting with the crude methyl-6α-chloro-3,11-diketo-4,17(20)-pregnadiene-21-oate, the 6α-chloro-11β,21-dihydroxy-4,17(20)-pregnadiene-3-one 21-acetate is obtained.

21 - acetoxy - 11β-hydroxy-4,17(20)-pregnadiene-3-one (3.70 g.) is heated and stirred at 75–100° C. with 1.1 to 2.2 grams of selenium dioxide in 135 ml. of dioxane and 15 ml. of water. When reaction to form the 21-acetoxy-11β,16α-dihydroxy-4,17(20)-pregnadiene-3-one is at the maximal the solution is filtered with the aid of Super-Cel (an infusorial earth) and taken to dryness. The residue is taken up in ethyl acetate and washed successively with aqueous sodium bicarbonate, ammonium sulfide, dilute aqueous ammonia, dilute hydrochloric acid and finally with water. The organic solvent is dried, treated with activated charcoal, taken to dryness and chromatographed on silica gel to afford 21-acetoxy-11β,16α-dihydroxy-4,17(20)-pregnadiene-3-one.

A solution of 21-acetoxy-11β,16α-dihydroxy-4,17(20)-pregnadiene-3-one (400 mg.) in 10 ml. of ether and 1 ml. of tributylamine is treated with 0.2 ml. of thionyl chloride. After ten minutes, the solution is poured into iced sodium dihydrogen phosphate and extracted with ethyl acetate. Removal of the dried solvent leaves a residue which contains 20-chloro-21-acetoxy-11β-hydroxy-4,16-pregnadiene-3-one. This is dissolved in 10 ml. of ethanol to which 1 N sodium chloride is added dropwise until alkalinity persists over a period of ten minutes. Then acetic acid is carefully added to neutrality and the solvent is removed under vacuum. The residue is dissolved in ethyl acetate, washed with water, and chromatographed on silica gel to afford 20,21-epoxy-11β-hydroxy-4,16-pregnadiene-3-one.

To a solution of 200 mg. of 20,21 epoxy-11β-hydroxy-4,16-pregnadiene-3-one in 2 ml. of chloroform and 2 ml. of tetrahydrofuran in a polyethylene bottle at −60° C. is added 2 ml. of 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the combined organic solvent is washed with sodium bicarbonate and dried. The residue after removal of solvent is treated at room temperature with one ml. of acetic anhydride and one ml. of pyridine. The reaction mixture is taken to dryness under high vacuum on a rotating evaporator and chromatographed on neutral alumina to afford 21-acetoxy-16α-fluoro-11β-hydroxy-4,17(20)-pregnadiene-3-one.

A solution of 325 mg. of 2-acetoxy-16α-fluoro-11β-hydroxy-4,17(20)-pregnadiene-3-one is prepared in 10 ml. of t-butanol, 3 ml. of methylene chloride and 0.4 ml. of pyridine. To the solution is added 1.1 ml. of a solution of N-methylmorpholine oxide-hydrogen peroxide complex in t-butanol. A milligram of osmium tetroxide is added and the solution is stirred at room temperature over night. Excess reagent is then destroyed by stirring the solution vigorously with aqueous sodium hydrosulfite. After filtration, the organic layer is washed with aqueous sodium dihydrogen phosphate and water, dried and removed under vacuum. Chromatography through a column of magnesium silica gel, as for example, the product sold by the Floridin Co., Tallahassee, Florida, under the trade name of Florisil affords 16α-fluoro-11β,17α-dihydroxy-21-acetoxy-4-pregnene-3,20-dione.

The N-methylmorpholine oxide-hydrogen peroxide is prepared by the following procedure: To a solution of 26 grams (0.25 mole) of N-methylmorpholine in 100 milliliters of tertiary butyl alcohol is added 34 grams (0.50 mole) of fifty percent hydrogen peroxide portionwise, with stirring, and while maintaining the reaction temperature at between thirty and thirty-five degrees centigrade with water bath. The resulting solution is then diluted to 170 millimeters with tertiary butyl alcohol, maintained at room temperature for 48 hours, and then dried with sixty grams of anhydrous magnesium sulfate for an additional 24 hours. The magnesium sulfate is removed by filtration and the filtrate is distilled to dryness to produce crystalline N-methylmorpholine peroxide. Alternatively, the solution can be titrated for available peroxide and the N-methylmorpholine oxide peroxide used without isolation.

Five hundred milligrams of 21-acetoxy-16α-fluoro-11β,17α-dihydroxy-4-pregnene-3,20-dione is dissolved in a mixture of 5 ml. of benzene and 5 ml. of a 1 N-methanolic potassium hydroxide and the solution is allowed to stand at room temperature for ten minutes. The solution is then acidified with acetic acid, diluted with ethyl acetate and washed with water. Removal of the dried solvent leaves a residue of 16α-fluoro-11β,17α,21-trihydroxy-4-pregnene-3,20-dione. This is stirred at room temperature for 70 hours with a mixture of 18 ml. of chloroform, 5 ml. of concentrated hydrochloric acid and 5 ml. of 37% formaldehyde. The chloroform layer is separated and the aqueous layer is extracted several more times with chloroform. The combined organic solvent is washed with aqueous sodium bicarbonate and dried. Removal of the solvent leaves a residue containing 17α,20,20,21-bis-(methylenedioxy)-16α-fluoro - 11β - hydroxy-4-pregnene-3,20-dione which is further purified by crystallization from methanol.

As suspension of 7α,20,20,21-bis(methylenedioxy)-11β - hydroxy-16α-fluoro-4-pregnene-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 17α,20,20,21-bis(methylenedioxy)-16α-fluoro-11β-hydroxy-4,6-pregnadiene - 3,20-dione.

The above 16α-fluoro compounds are converted into the [3,2-c]pyrazoles following the procedures outlined in Example 8, columns 8 and 9.

*Example 10*

The 5'-subsituted-[3,2-c]pyrazoles used starting material can be prepared by the following procedures: To a suspension of 25.0 g. of 11β,17α,21-trihydroxy-4-pregnene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting materials by paperstrip chromatography but shows two U.V. absorbing spots near the solvent front (methanol-formamide 2:1 vs. benzene-n-hexane 1:1). A 2.425 g. aliquot is recrystallized three times from a mixture of benzene and n-hexane to give 17α,20,20,21-bis(methylenedioxy)-11β-hydroxy - 4 - pregnene-3-one which is used in the subsequent step of the synthesis without further purification.

Sodium methoxide (prepared by heating sodium and methanol at 170° C. for 3 hours), 3.7 g. and 150 ml. of distilled diethyl oxalate are stirred under nitrogen for about 15 minutes. 4 grams of 17α,20,20,21-bis(methylenedioxy)11β-hydroxy-4-pregnene-3-one is added and the mixture is stirred under the nitrogen at room temperature for 4 hours. The product is poured into 100 ml. of cold water, acidified with a saturated aqueous solution of sodium dihydrogen phosphate and extracted three times with 100 ml. portions of ether. The ether extracts are washed two times with 2% sodium hydroxide solution, and then two times with 50 ml. portions of water. The ether extract is dried over magnesium sulfate and filtered. The ether is then removed under vacuum on a steam bath and the residual diethyl oxalate is removed by vacuum distillation under nitrogen using an oil bath heated to 100–110° C. The dark oil is triturated with 1.0 ml. of ethanol. The crystalline product is filtered, washed with cold ethanol and then with n-hexane, and then dried in an Abderhalden to give 17α,20,20,21-bis(methylenedioxy)-2-ethoxalyl-11β-ethoxalyloxy-4-pregnene-3-one.

A 200 mg. portion of 17α,20,20,21-bis(methylenedioxy)-2-ethoxalyl - 11β - ethoxalyloxy-4-pregnene-3-one, (0.33 millimole) is treated with 6.0 ml. of ethanol, and then with 1.0 ml. of a solution of phenylhydrazine (0.365 ml.) in 10 ml. of ethanol. The mixture is heated at the reflux temperature under nitrogen for one hour. Removal of the solvent by heating on a steam bath gives a yellow gum which is stirred with 8.0 ml. of water, filtered and washed three times with 3 ml. portions of water. The product is then dried in an Abderhalden for 2 hours at the boiling temperature of acetone to give a mixture, the major component of which is the 2'-phenyl-17α,20,20,21-bis(methylenedioxy)-11β-ethoxalyloxy-5'-ethoxy - carbonyl-4-pregneno-[3,2-c]pyrazole.

The 17α,20,20,21-bis(methylenedioxy)-11β-ethoxalyloxy-5'-ethoxycarbonyl-2'-phenyl-4-pregneno-[3,2-c]pyrazole (200 mg.) is dissolved in ethanol and treated with 3 ml. of a solution of 200 mg. of potassium hydroxide in 10 ml. of ethanol. The mixture is heated at reflux temperature under nitrogen for one hour, whereupon potassium oxalate separates. The product is filtered and washed with cooled ethanol. The filtrate is taken to dryness to given an amorphous residue which is dissolved in 50 ml. of water and extracted with 10 ml. of ether. The aqueous extract is acidified with saturated sodium dihydrogen phosphate and extracted three times with 20 ml. of ether. The ether extract is dried over magnesium sulfate, is filtered and the solvent removed. The residue is dried to afford 17α,20,20,21 - bis(methylenedioxy) - 5'-carboxy-11β-hydroxy-2'-phenyl-4-pregneno-[3,2-c]pyrazole.

Eighty milligrams of 17α,20,20,21-bis(methylenedioxy) 5' - carboxy - 11β - hydroxy - 2'-phenyl-4-pregneno-[3,2-c] pyrazole is treated with 5.0 ml. of 60% formic acid and heated on a steam bath under nitrogen for thirty-five minutes. The reaction product is then cooled to room temperature. The formic acid is removed in vacuo at steam bath temperature. About 5 ml. of water is added. The product separates and is filtered, washed well with water and dried under vacuum to give 5'-carboxy-11β,17α,21-trihydroxy-20-oxo-2'-phenyl-4-pregneno-[3,2-c]pyrazole.

A 500 mg. portion of 17α,20,20,21-bis(methylendioxy)-11β-ethoxalyloxy-5'-ethoxycarbonyl-2'-phenyl-4-pregneno-[3,2-c]pyrazole is dissolved in 30 ml. of dioxane which has been distilled over sodium, and treated with 285 mg. of lithium aluminum hydride. The mixture is heated at the reflux temperature for three hours and forty-five minutes. The product is allowed to cool to room temperature, and then cooled further in ice. Ethyl acetate is added to destroy the excess lithium aluminum hydride. A saturated salt solution is added until a granular deposit of salt is formed; then the insoluble salts are filtered off. Ether (10 ml.) is added and the ether layer is separated and washed with a 5 ml. portion of saturated salt solution. The organic phase is dried over magnesium sulfate, filtered, and the solvent removed in vacuo. The crude product is dissolved in chloroform. The chloroform is removed on a steam bath and the product is dried in an Abderhalden at the boiling point of acetone to give 17α,20,20,21-bis(methylenedioxy) - 11β - hydroxy-5'-hydroxymethyl-2'-phenyl-4-pregneno-[3,2-c]pyrazole.

One hundred mg. of 17α,20,20,21-bis(methylenedioxy)-11β - hydroxy-5'-hydroxymethyl-4-pregneno-[3,2-c]pyrazole is treated with 5.0 ml. of 60% formic acid and heated on the steam bath under nitrogen for forty minutes. A slightly insoluble product separates and is filtered off. The mother liquor is heated on the steam bath in vacuo to remove excess acid. About 5 ml. of water is added and the product that separates is filtered and washed well with water. The residue is dried in an Abderhalden at the boiling temperature of acetone for two hours at room temperature to give 66.4 mg. of crude product, which is dissolved in about 10 ml. of ether to which a small amount of methanol has been added. About 60 mg. of Darco G-60 (a decolorizing carbon) is added and the mixture is stirred at room temperature for two hours and then filtered through a mat of Super-Cel (an infusorial earth). The solvent is removed to give 11β,17α,21-trihydroxy-5'-hydroxymethyl - 20 - oxo-2'-phenyl-4-pregneno-[3,2-c]pyrazole.

To a solution of 85 mg. of 17α,20,20,21-bis(methylenedioxy) - 11β-hydroxy-5'-hydroxymethyl-2'-phenyl-4-pregneno-[3,2-c]pyrazole in 0.5 ml. of pyridine, cooled to 0° C., is added 0.03 ml. of tosyl chloride. The resulting mixture is allowed to stand at room temperature over night. Water is then added to the reaction mixture and the precipitate which forms is recovered by filtration, washed with water, and dried to give the 17α,20,20,21-bis(methylenedioxy) - 11β-hydroxy-5'-tosyloxymethyl-2'-phenyl-4-pregneno-[3,2-c]pyrazole.

A 500 mg. portion of 17α,20,20,21-bis(methylenedioxy) - 11β - hydroxy-5'-tosyloxymethyl-2'-phenyl-4-pregneno-[3,2-c]pyrazole is dissolved in 30 ml. of dioxane which has been distilled over sodium, and treated with 285 mg. of lithium aluminum hydride. The mixture is heated at the reflux temperature for about 4 hours. The product is allowed to cool to room temperature, and then cooled further in ice. Ethyl acetate is added to destroy the excess lithium aluminum hydride. A saturated salt solution is added until a granular deposit of salt is formed; then the insoluble salts are filtered off. Ether (10 ml.) is added and the ether layer is separated and washed with a 5 ml. portion of saturated salt solution. The organic phase is dried over magnesium sulfate, filtered, and the solvent removed in vacuo. The crude product is dissolved in chloroform. The chloroform is removed on a steam bath and the product is dried in Abderhalden to the boiling point of acetone to give 17α,20,20,21-bis(methylenedioxy)-11β-hydroxy-5'-methyl-2'-phenyl-4-pregneno-[3,2-c]pyrazole.

A suspension containing 80 mg. of 17α,20,20,21-bis-(methylenedioxy) - 11β - hydroxy-5′-methyl-2′-phenyl-4-pregneno-[3,2-c]pyrazole and 8 cc. of 60% aqueous formic acid is heated inside a steam cone for 40 minutes. The resulting solution is cooled and extracted with chloroform. The chloroform layer is washed with aqueous sodium bicarbonate solution, dried over sodium sulfate and concentrated under vacuum. The crude concentrate is dried by azeotropic distillation with benzene and then subsequently treated for 15 minutes with 0.07 milliequivalent of sodium methoxide in 1.0 ml. of methanol in water to cleave any formate esters. Isolation by crystallization affords the 11β,17α,21 - trihydroxy-5′-methyl - 20 - oxo - 2′ - phenyl-4-pregneno-[3,2-c]pyrazole. After neutralization with acetic acid the solution is diluted with water and extracted with chloroform. The chloroform layer is dried over sodium sulfate and concentrated under vacuum. The material is acetylated with acetic anhydride in pyridine, and chromatographed on silica gel. The column is eluted with ether-chloroform mixtures to obtain 11β,17α-21-trihydroxy-5′-methyl-20-oxo-2′-phenyl-4-pregneno-[3,2-c]pyrazole 21-acetate.

Various changes and modifications may be made in carrying out the present invention without departing from the spirit and scope thereof. Insofar as these changes and modifications are within the purview of the annexed claims, they are to be considered as part of my invention.

I claim:
1. A compound selected from the group of compounds having the following structural formula, and the 4,6-pregnadieno- and 5α-pregnano-analogues of said compounds:

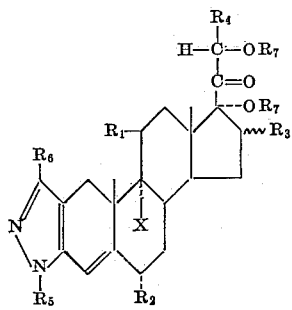

and

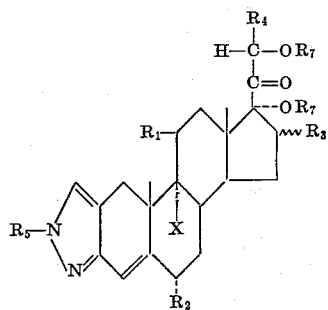

wherein $R_1$ is a member of the group consisting of hydrogen, β-halogen, β-hydroxy and keto, but halogen is present at $R_1$ only when X is halogen, and hydrogen is present at $R_1$ only when X is hydrogen; $R_2$ is a member of the group consisting of hydrogen, α-fluoro and α-methyl; $R_3$ is a member of the group consisting of hydrogen, α-methyl, β-methyl, and methylene; $R_4$ is lower alkyl; $R_5$ is a member of the group consisting of lower alkyl, lower aralkyl, aryl, pyridyl, pyridyl oxide and pyrimidyl; $R_6$ is a member of the group consisting of lower alkoxycarbonyl, carboxyl and hydroxymethyl; $R_7$ is a member of the group consisting of hydrogen and lower alkanoyl; and X is a member of the group consisting of hydrogen and halogen.

2. A compound selected from the group of compounds having the following structural formulas, and the 5α-pregnano analogues thereof:

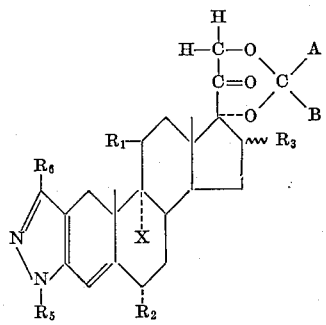

and

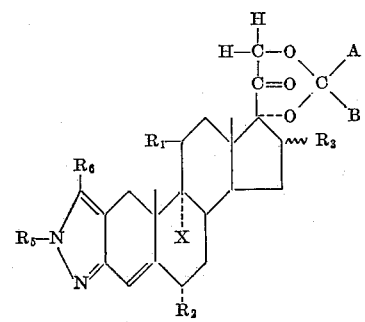

wherein $R_1$ is a member of the group consisting of hydrogen, β-halogen, β-hydroxy and keto, but halogen is present at $R_1$ only when X is halogen, and hydrogen is present at $R_1$ only when X is hydrogen; $R_2$ is a member of the group consisting of hydrogen, α-fluoro and α-methyl; $R_3$ is a member of the group consisting of hydrogen, α-methyl, β-methyl and methylene; $R_5$ is a member of the group consisting of lower alkyl, lower aralkyl, aryl, pyridyl, pyridyl oxide and pyrimidyl; $R_6$ is a member of the group consisting of lower alkoxycarbonyl, carboxyl, hydroxymethyl and methyl, and X is a member of the group consisting of hydrogen and halogen, A and B are each selected from the group consisting of hydrogen, lower alkoxy, lower alkyl and aryl, and together with the carbon to which they are joined, A and B are lower cycloalkyl, but lower alkoxy group is present at A only when lower alkyl group is present at B.

3. A compound selected from the group of compounds having the following structural formulas, and the 5α-pregnano analogues thereof:

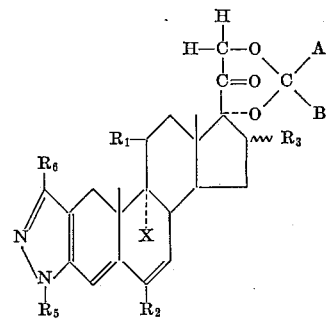

and

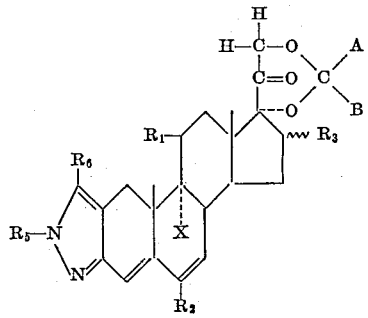

wherein $R_1$ is a member of the group consisting of hydrogen, β-halogen, β-hydroxy and keto, but halogen is present at $R_1$ only when X is halogen, and hydrogen is present at $R_1$ only when X is hydrogen; $R_2$ is a member of the group consisting of hydrogen and fluoro; $R_3$ is a member of the group consisting of hydrogen, β-methyl and methylene; $R_5$ is a member of the group consisting of lower alkyl, aralkyl, aryl, pyridyl, pyridyl oxide and pyrimidyl; $R_6$ is a member of the group consisting of lower alkoxycarbonyl, carboxyl, hydroxymethyl and methyl, and X is a member of the group consisting of hydrogen and halogen. A and B are each selected from the group consisting of hydrogen, lower alkoxy, lower alkyl and aryl, and together with the carbon to which they are joined, A and B are lower cycloalkyl, but lower alkoxy group is present at A only when lower alkyl group is present at B.

4. A compound selected from the group of compounds having the following structural formula and the 4,6-pregnadieno and 5α-pregnano analogues of these compounds:

and

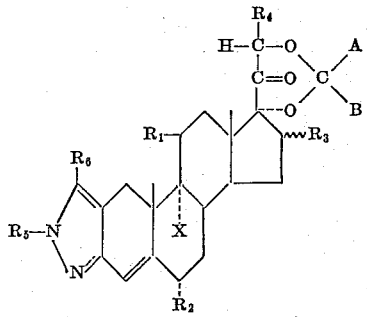

wherein $R_1$ is a member of the group consisting of hydrogen, β-halogen, β-hydroxy and keto, but halogen is present at $R_1$ only when X is halogen, and hydrogen is present at $R_1$ only when X is hydrogen; $R_2$ is a member of the group consisting of hydrogen, α-fluoro and α-methyl; $R_3$ is a member of the group consisting of hydrogen, α-methyl, β-methyl and methylene; $R_4$ is lower alkyl; $R_5$ is a member of the group consisting of hydrogen, lower alkyl, lower aralkyl, aryl, acyl pyridyl, pyridyl oxide and pyrimidyl; $R_6$ is a member of the group consisting of lower alkoxycarbonyl, carboxyl, hydroxymethyl and methyl, and X is a member of the group consisting of hydrogen and halogen; A and B are each selected from the group consisting of hydrogen, lower alkoxy, lower alkyl and aryl, and together with the carbon to which they are joined, A and B are lower cycloalkyl, but lower alkoxy group is present at A only when an alkyl group is present at B.

5. A compound selected from the group consisting of 11β,17α,21 - trihydroxy - 5' - hydroxymethyl - 16α,21-dimethyl - 20 - oxo - 2' - phenyl - 4 - pregneneo-[3,2-c] pyrazole and the 17α-lower alkanoates and the 21-lower alkanoates thereof.

References Cited by the Examiner

UNITED STATES PATENTS

| | | | |
|---|---|---|---|
| 3,047,594 | 7/1962 | Hess | 260—397.45 |
| 3,064,017 | 11/1962 | Figdor et al. | 260—397.45 |
| 3,067,193 | 12/1962 | Tishler et al. | 260—239.5 |
| 3,067,194 | 12/1962 | Tishler et al. | 260—239.5 |
| 3,116,289 | 12/1963 | Tanabe | 260—239.55 |

LEWIS GOTTS, *Primary Examiner.*

H. A. FRENCH, *Assistant Examiner.*